(12) United States Patent
Van Der Lubbe

(10) Patent No.: US 12,209,746 B2
(45) Date of Patent: Jan. 28, 2025

(54) LASER SOURCE TUNABLE WHITE LIGHT MODULE

(71) Applicant: SIGNIFY HOLDING B.V., Eindhoven (NL)

(72) Inventor: Marcellus Jacobus Johannes Van Der Lubbe, Best (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/694,512

(22) PCT Filed: Sep. 27, 2022

(86) PCT No.: PCT/EP2022/076775
§ 371 (c)(1),
(2) Date: Mar. 22, 2024

(87) PCT Pub. No.: WO2023/052331
PCT Pub. Date: Apr. 6, 2023

(65) Prior Publication Data
US 2024/0392946 A1    Nov. 28, 2024

(30) Foreign Application Priority Data

Oct. 1, 2021   (EP) .................................. 21200398

(51) Int. Cl.
*F21V 9/00*    (2018.01)
*F21V 9/30*    (2018.01)
(Continued)

(52) U.S. Cl.
CPC ............. *F21V 9/30* (2018.02); *F21Y 2113/13* (2016.08); *F21Y 2115/10* (2016.08)

(58) Field of Classification Search
CPC ..... F21V 9/30; F21Y 2115/10; F21Y 2113/13
See application file for complete search history.

(56) References Cited

U.S. PATENT DOCUMENTS 11,098,886 B2    8/2021   Zhou et al.
2011/0032724 A1   2/2011   Kinoshita
(Continued)

FOREIGN PATENT DOCUMENTS

DE    10032837 A1    1/2002
EP    2466375 A1    6/2012
(Continued)

*Primary Examiner* — Gerald J Sufleta, II

(57) ABSTRACT

The invention provides a light generating system (1000) comprising m light generating devices (100) and a beam combiner body (500), wherein: the m light generating devices (100) are configured to generate device light (101), wherein the light generating devices (100) comprise one or more light sources selected from the group of lasers and superluminescent diodes, wherein m≥2; the beam combiner body (500) comprises a first face (501), wherein the first face (501) comprises n radially arranged grooves (510) radially extending from a central cavity (520), wherein n≥2, wherein the n radially arranged grooves (510) have groove lengths (L); at least one of the radially arranged grooves (510) comprises a first body (205), wherein the first body (205) comprises a luminescent body (210), wherein the luminescent body (210) comprises a luminescent material (200) configured to convert at least part of the device light (101) into luminescent material light (201); wherein the first body (205) has a first body height (Hl) smaller than the groove length (L); the m light generating devices (100) and the beam combiner body (500) are configured such that at least part of the device light (101) of the m light generating devices (100) propagates during operation of the m light generating devices (100) through the radially arranged grooves (510) in a direction of the central cavity (520), and at least one of the m light generating devices (100) is configured to irradiate the first body (205).

15 Claims, 4 Drawing Sheets

(51) Int. Cl.
*F21Y 113/13* (2016.01)
*F21Y 115/10* (2016.01)

(56) References Cited

U.S. PATENT DOCUMENTS

| | | | |
|---|---|---|---|
| 2018/0316160 A1* | 11/2018 | Raring | H01S 5/0233 |
| 2018/0372280 A1* | 12/2018 | Van Bommel | G02B 6/0068 |
| 2019/0323663 A1* | 10/2019 | Rudy | H01S 5/34333 |
| 2020/0158936 A1* | 5/2020 | Hikmet | F21K 9/64 |
| 2020/0200348 A1* | 6/2020 | Romero | H01S 5/02355 |
| 2020/0400299 A1 | 12/2020 | Zhou et al. | |

FOREIGN PATENT DOCUMENTS

| | | |
|---|---|---|
| EP | 3779268 A1 | 2/2021 |
| WO | 2020078790 A1 | 4/2020 |
| WO | 2021032721 A1 | 2/2021 |

* cited by examiner

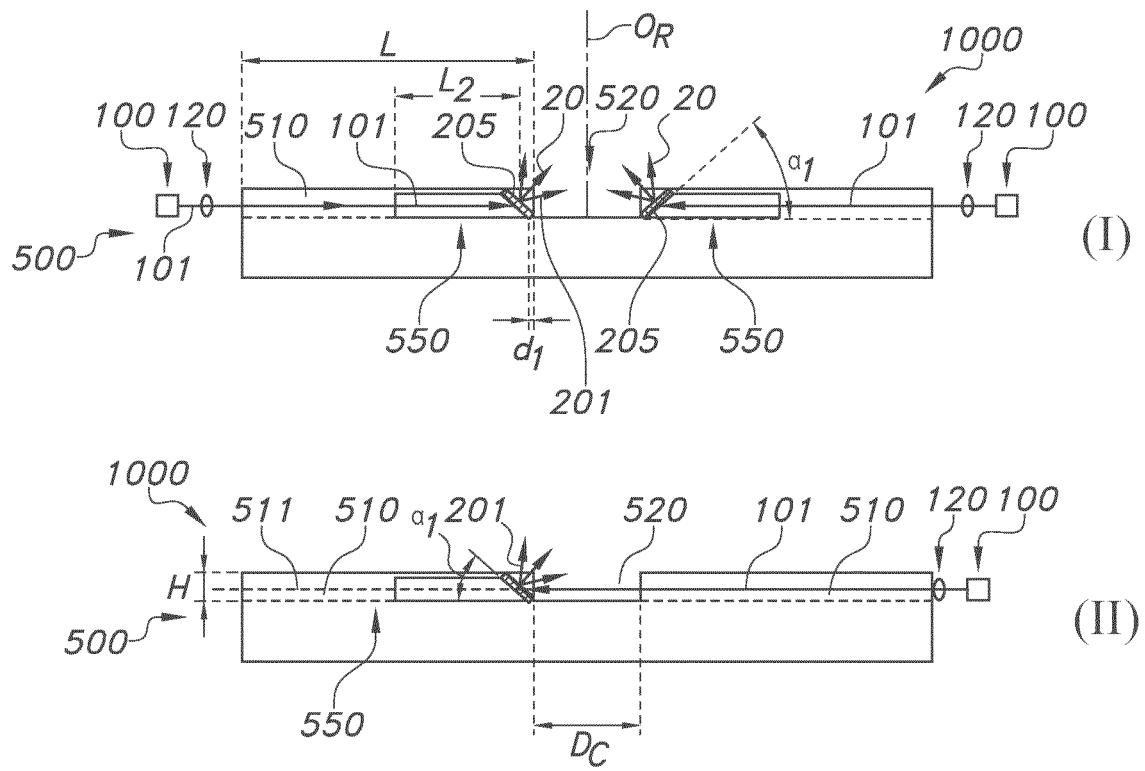
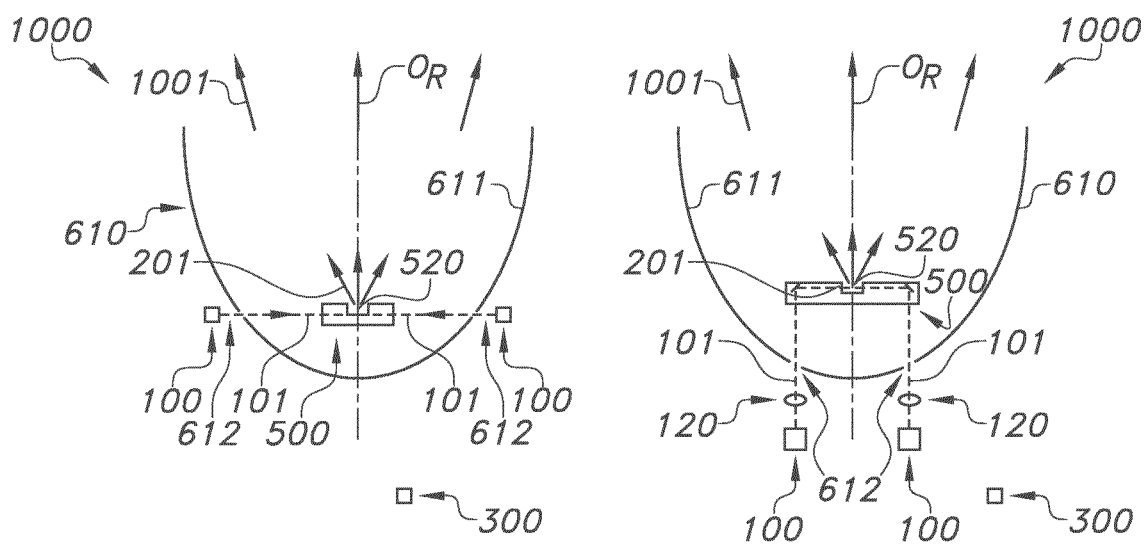
FIG. 1B
FIG. 2A

LASER SOURCE TUNABLE WHITE LIGHT MODULE

CROSS-REFERENCE TO PRIOR APPLICATIONS

This application is the U.S. National Phase application under 35 U.S.C. § 371 of International Application No. PCT/EP2022/076775, filed on Sep. 27, 2022, which claims the benefit of European Patent Application No. 21200398.2, filed on Oct. 21, 2021. These applications are hereby incorporated by reference herein.

FIELD OF THE INVENTION

The invention relates to a system, especially for generating light, and to a light generating device comprising such system.

BACKGROUND OF THE INVENTION

Light sources with laser diodes are known in the art. US2018/0316160, for instance, describes a device and method for an integrated white colored electromagnetic radiation source using a combination of laser diode excitation sources based on gallium and nitrogen containing materials and light emitting source based on phosphor materials. A violet, blue, or other wavelength laser diode source based on gallium and nitrogen materials may be closely integrated with phosphor materials, such as yellow phosphors, to form a compact, high-brightness, and highly-efficient, white light source. The phosphor material is provided with a plurality of scattering centers scribed on an excitation surface or inside bulk of a plate to scatter electromagnetic radiation of a laser beam from the excitation source incident on the excitation surface to enhance generation and quality of an emitted light from the phosphor material for outputting a white light emission either in reflection mode or transmission mode.

WO2020/078790A discloses a light generating system comprising a plurality of light sources and an elongated luminescent body comprising a radiation input face configured in a light receiving relationship with the plurality of light sources. A body holder structure comprises an elongated slit for hosting the elongated luminescent body and one or more spring elements are configured to keep the elongated body pushed into the elongated slit.

DE10032837A discloses a device having a base body of transparent material with at least two light input coupling surfaces and a reflector partly covering the base body with openings for the input coupling surfaces and containing an electrical conductor network with at least two exposed contact sections per light input coupling surface.

EP2466375A discloses a light source apparatus having a light source which emits exciting light, and a metal member to which the exciting light is input, wherein the metal member has a concave portion in a portion to which the exciting light is input, and a phosphor that is coated in the concave portion.

US2011/032724A discloses a light emitting device with a light emitting element, a substrate including a groove-like light guide extending along a first direction. Light emitted from the light emitting element is introduced into the light guide and being turned into upward light directed upward above the substrate. A lens is provided above the light guide and configured to collect the upward light and control light distribution characteristic in a plane generally perpendicular to the first direction.

EP3779268 discloses an illumination device that includes a housing, a wavelength converting component which is disposed inside the housing and that radiates a wavelength-converted light. An optical film covers an opening portion of the housing and has optical properties such that the transmittance for the wavelength-converted light is 80% or more. A light diffusing structure is disposed on at least part of the inner wall of the housing and diffusely reflects the laser beam reflected at least by the optical film.

SUMMARY OF THE INVENTION

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

One of the problems that may be associated with such (laser) light sources is the heat management of the (ceramic) phosphor. Other problems associated with such laser light sources may be the desire to create compact high power devices.

Hence, it is an aspect of the invention to provide an alternative (light generating) system, which preferably further at least partly obviates one or more of above-described drawbacks. The present invention may have as object to overcome or ameliorate at least one of the disadvantages of the prior art, or to provide a useful alternative.

Hence, in a first aspect the invention provides a light generating system comprising m light generating devices and a beam combiner body, wherein: (a) the m light generating devices are configured to generate device light, wherein the light generating devices comprise one or more light sources selected from the group of lasers and superluminescent diodes, wherein m≥2; (b) the beam combiner body comprises a first face, wherein the first face comprises n radially arranged grooves radially extending from a central cavity, wherein n≥2, wherein the n radially arranged grooves have groove lengths (L); (c) at least one of the radially arranged grooves comprises a first body, wherein the first body comprises a luminescent body, wherein the luminescent body comprises a luminescent material configured to convert at least part of the device light into luminescent material light; wherein the first body has a first body height (H1) as determined in parallel to the groove length (L) of the at least one of the radially arranged groove, the first body height (H1) being smaller than the groove length (L) of the at least one of the radially arranged groove; and (d) the m light generating devices and the beam combiner body are configured such that at least part of the device light of the m light generating devices propagates during operation of the m light generating devices through the radially arranged grooves in a direction of the central cavity, and at least one of the m light generating devices is configured to irradiate the first body.

With such system, efficiency may be relatively high as a large area of the luminescent body may be in thermal contact with a thermally conductive material, such as a heatsink. Further, a relatively small device, e.g. a package, may be provided which may be able to provide light with a relatively high intensity. The present invention may provide a compact transmissive configuration or a compact reflective configuration, with improved heat removal from the phosphor. Further a system may be provided having a controllable color point, such as correlated color temperature of the system light generated by the system.

As indicated above, the light generating system may comprise m light generating devices and a beam combiner body.

Each light generating device may comprise one or more light sources. especially, each light generating device may consist of a light source, and optionally optics, e.g. to collimate the light of the light source. Especially, the light source is configured to generate the first light.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . . The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi-LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape) and a spectral power distribution. The light source light may in embodiments comprise one or more bands, having band widths as known for lasers The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like a LED, and an optical filter, which may change the spectral power distribution of the light generated by the light source. Especially, the "term light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" or "solid state material laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O(BO$_3$)$_3$ or Nd:YCOB, neodymium doped yttrium orthovanadate (Nd:YVO$_4$) laser, neodymium glass (Nd:glass) laser, neodymium YLF (Nd:YLF) solid-state laser, promethium 147 doped phosphate glass (147Pm$^{3+}$:glass) solid-state laser, ruby laser (Al$_2$O$_3$:Cr$^{3+}$), thulium YAG (Tm:YAG) laser, titanium sapphire (Ti:sapphire; Al$_2$O$_3$:Ti$^{3+}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc.

For instance, including second and third harmonic generation embodiments, the light source may comprise one or more of an F center laser, an yttrium orthovanadate (Nd:YVO$_4$) laser, a promethium 147 doped phosphate glass (147Pm$^{3+}$:glass), and a titanium sapphire (Ti:sapphire; Al$_2$O$_3$:Ti$^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a diode laser, or a superluminescent diode.

Superluminescent diodes are known in the art. A superluminescent diode may be indicated as a semiconductor device which may be able to emit low-coherence light of a broad spectrum like a LED, while having a brightness in the order of a laser diode.

US2020192017 indicates for instance that "With current technology, a single SLED is capable of emitting over a bandwidth of for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in Figure 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

In embodiments, the light source may be selected from the group of (a) lasers, especially laser diodes, and (b) superluminescent diodes. Hence, especially each light generating device may comprise one or more lasers, especially laser diodes, and/or one or more superluminescent diodes. Especially, one or more of the light generating device each comprise a single light source selected from the group of (a) lasers, especially laser diodes, and (b) superluminescent diodes. Hence, the light generating devices comprise one or more light sources selected from the group of lasers and superluminescent diodes. However, alternatively or additionally other solid state material lasers may also be applied.

Especially, the m light generating devices may be configured to generate device light. During operating of the respective light generating device, the respective device will generate the device light. In embodiments, the device light may be collimated (with an optical element, e.g. configured downstream of the light source). The device light may also be focused. The term "optical element" may also refer to a plurality of (different) optical elements.

In embodiments, each light generating device is configured to generate device light with essentially the same spectral power distribution. For instance, the respective light sources may be from the same bin. Assuming the light generating devices to generate visible light, the color points may be essentially the same.

In (other) embodiments, two or more of the m light generating devices may be configured to generate device light with essentially the same spectral power distributions. For instance, the respective light sources may be from the same bin. Assuming the light generating devices to generate visible light, the color points may be essentially the same. In (other) embodiments, two or more of the m light generating devices may be configured to generate device light having different spectral power distributions. For instance, the respective light sources may be from different bins. Assuming the light generating devices to generate visible light, the color points may be different.

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

In other specific embodiments, colors or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram.

In specific embodiments, in the case of different spectral power distributions, at least two spectral power distributions of the device light (in at least two respective operational modes) may have centroid wavelengths differing least 10 nm, such as at least 20 nm, or even at least 30 nm, such as a difference selected from the range of 30-200 nm. Spectral power distributions having centroid wavelengths differing least 10 nm, such as at least 20 nm, or even at least 30 nm may be considered different spectral power distributions, e.g. different colors.

In embodiments, m≥2. In specific embodiments, m may be selected from the range of 2-100, such as 2-30, like at least 3.

The beam combiner may be used to combine light of multiple sources of light, especially in a central cavity. The beam combiner may have a substantially circular shape. For instance, the beam combiner may have a cylindrical shape.

Especially, the beam combiner may be of a material that is thermally conductive and/or reflective for the device light and/or reflective for the luminescent material light. Therefore, especially the beam combiner body is (a) thermally conductive and/or (b) reflective for one or more of the device light and the luminescent material light. For instance, in embodiments the beam combiner body may comprise a metal body or a ceramic body.

Hence, in embodiment the beam combiner body may be a thermally conductive element (or may comprise a thermally conductive element). A thermally conductive element may especially comprise thermally conductive material. A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

In embodiments, the beam combiner body may be thermally coupled, such as physically coupled, to a heatsink or a heat spreader. The beam combiner may also be a monolithic body with a heatsink or heat spreader.

The beam combiner may be of a reflective material, such as one or more of the afore-mentioned metals, and/or may comprise a reflective coating of a reflective material. The reflective material may be a specular reflective material, such as an aluminum mirror. The reflective material may also be diffuse reflective material, such as a coating of a particulate white material. Suitable reflective material for reflection in the visible may be selected from the group consisting of $TiO_2$, $BaSO_4$, MgO, and $Al_2O_3$.

As indicated above, the beam combiner body comprises a first face, wherein the first face may comprise n radially arranged grooves radially extending from a central cavity. Further, the n radially arranged grooves may have groove lengths (L). Seen from the central cavity, the grooves may be configured radially extending from the central cavity. The cavity may be an indentation in the beam combiner body. In embodiments, it is not a through hole, but a cavity or indentation in the beam combiner body. The depth of the cavity and the grooves may in embodiments essentially be the same. The cavity may have a substantially circular shape. For instance, the central cavity may have a cylindrical shape The grooves may extend from the central cavity like spokes in a wheel may extend from a central hub. Herein, however, the central hub and the spokes are hollow elements in the beam combiner body. Unless indicated otherwise, the grooves may especially be elongated grooves, which are essentially radially arranged.

In embodiments, the first face may have a first face diameter Df. In further embodiments, the central cavity may have a central cavity diameter Dc. Especially, in embodiments $0.001 \leq Dc/Df \leq 0.25$, more especially $0.01 \leq Dc/Df \leq 0.1$. In embodiments, the first face diameter Df may be selected from the range of 1-100 mm, like especially selected from the range of 2-20 mm. The length of the grooves may in embodiments have values of 0.5*Df–0.5*Dc. Shorter grooves, however, are not excluded, but then mirrors may be available in the groove, or the groove might have a mirroring end. Herein, the invention is explained in relation to grooves having a length from an edge of the first face to the central cavity.

Especially, n≥2. More especially, n≥3. In embodiments, n is selected from 4, 6, 8, 10, 12, 16, and 18. However, higher numbers may also be possible. Especially, n may be selected from the range of 3-18.

The light generating system may be used to generate system light. The system light may in operational modes comprise luminescent material light of a luminescent material, which (luminescent material) is configured to convert at least part of the device light into luminescent material light. The luminescent material is especially be configured in at least one of the radially arranged grooves. The luminescent material is especially comprised by a luminescent body. For instance, the luminescent body may be the luminescent material (see also below). The luminescent body may be comprised by the first body. Especially, a first body is a luminescent body. Hence, the term "first body" may especially refer to a luminescent body. As will be further elucidated below, there may be one first body, there may be two or more essentially the same first bodies, and alternatively or additionally, there may be two or more different first bodies. Here below, the invention is first explained in relation to a single first body. For increasing intensity, two or more sets of light generating devices and (essentially the same) first bodies may be provided. Each set may be associated with a respective groove.

Hence, in embodiments at least one of the radially arranged grooves comprises a first body, wherein the first body comprises a luminescent body, wherein the luminescent body comprises a luminescent material configured to convert at least part of the device light into luminescent material light. The first body may have a first body height, which is determined parallel to the (longitudinal axis of the) groove wherein the first body height may be shorter than the groove length. Hence, especially the first body has a first body height (H1) smaller than the groove length (L).

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr, and Ca, especially in embodiments at least Sr. Hence, in embodiments, the luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr, or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not considering the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr, or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not considering the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO (Y$_2$SiO$_5$:Ce$^{3+}$), or similar compounds, or BAM (BaMgAl$_{10}$O$_{17}$:Eu$^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

The luminescent material light may especially have one or more wavelengths in the visible. More especially, the centroid wavelength of the luminescent material light may be in the visible.

In specific embodiments, the luminescent material may be configured to convert part of the light source light into luminescent material light having a wavelength in the 495-605 nm. In specific embodiments, a substantial part, like at least 85%, like at least 90%, more especially at least 95%, such as (essentially) 100% of the spectral power of the system light may be in the 495-605 nm wavelength range. In embodiments the centroid wavelength may be configured in the 495-605 nm wavelength range. More especially, the centroid wavelength may be configured in the 510-590 nm wavelength range, even more especially in the 570-590 nm wavelength range. Hence, in specific embodiments the light source light may be blue light and the luminescent material light may be yellow light or may comprise a combination of yellow and red light.

The term "centroid wavelength", also indicated as $\lambda c$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c = \Sigma \lambda * I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

Especially, the luminescent material is comprised by a first body. The first body may be a layer, like a self-supporting layer. The first body may also be a coating. Especially, the first body may essentially be self-supporting. In embodiments, the first body may be a ceramic body or a single crystalline body. Hence, the luminescent material may in embodiments be provided as ceramic body or a single crystalline body, such as is possible with e.g. cerium comprising garnet luminescent materials (see elsewhere herein). In other embodiments, the first body may comprise a light transmissive body, wherein the luminescent material is embedded. For instance, the first body may comprise a glass body, with luminescent material embedded therein. Or the glass as such may be luminescent. In other embodiments, the first body may comprise a polymeric body, with luminescent material embedded therein.

The first body may have any shape. In general, however, the first body may comprise two essentially parallel faces, defining a height (of the first body). Further, the first body may comprise an edge face, bridging the two essentially parallel faces. The edge face may be curved in one or two dimensions. The edge face may be planar. Especially, the edge face may be essentially planar; this may facilitate arrangement in the groove. The first body may have a rectangular or circular cross-section, though other cross-sections may also be possible. Especially, the first body may have a rectangular cross-section (perpendicular to a groove axis), as this may (also) facilitate arrangement in the groove. The two essentially parallel faces may also be indicated as "main faces", as they may especially provide the largest external area of the first body. Hence, the shape of the luminescent body may especially be chosen to fit in the groove.

In embodiments, the body has lateral dimensions width or length (W1 or L1) or diameter (D) and a thickness or height (H1). In embodiments, (i) D≥H1 or (ii) and W1≥H1 and/or L1≥H1. The luminescent tile may be transparent or light scattering. In embodiments, the tile may comprise a ceramic luminescent material. In specific embodiments, L1≤10 mm, such as especially L1≤5 mm, more especially L1≤3 mm, most especially L1≤2 mm. In specific embodiments, W1≤10 mm, such as especially W1≤5 mm, more especially W1≤3 mm, most especially W1≤2 mm. In specific embodiments, H1≤10 mm, such as especially H1≤5 mm, more especially H1≤3 mm, most especially H1≤2 mm. In specific embodiments, D≤10 mm, such as especially D≤5 mm, more especially D≤3 mm, most especially D≤2 mm. In specific embodiments, the body may have in embodiments a thickness in the range 50 μm-1 mm. Further, the body may have lateral dimensions (width/diameter) in the range 100 μm-10 mm. In yet further specific embodiments, (i) D>H1 or (ii) W1>H1 and W1>H1. Especially, the lateral dimensions like length, width, and diameter are at least 2 times, like at least 5 times, larger than the height. In specific embodiments, the first body has a first length L1, a first height H1, and a first width W1, wherein H1≤0.5*L1 and H1≤0.5*W1. For square body tiles, L1=W1.

The groove(s) may especially be accommodated to host such luminescent body. Hence, the cross-sectional dimensions of the groove may essentially be the same as width or length (W1 or L1) of the first body. Especially, the fit of the first body in the groove may be a transition fit. Hence, the groove may have cross-sectional dimensions of essentially the width (W1) of the first body and the length (L1) of the first body. The better the fit, the better thermal energy may be dissipated via the edge of the first body to the walls and bottom of the groove.

Device light may especially be guided through the groove to the luminescent material comprised by the first body. This may be in a transmissive mode, wherein especially the device radiation propagates in a first groove in a direction of the central cavity and before reaching the central cavity, reaches the luminescent body in the same first groove, or in a reflective mode, wherein the device radiation propagates in a first groove in a direction of the central cavity, propagates through the first cavity, before reaching the luminescent body which is configured in a second groove (opposite of the first groove; opposite relative to the central cavity); see further also below.

Hence, in embodiments the m light generating devices and the beam combiner body may be configured such that at least part of the device light of the m light generating devices propagates during operation of the m light generating devices through the radially arranged grooves in a direction of the central cavity, and at least one of the m light generating devices is configured to irradiate the first body. In this way, the luminescent material light is generated. Another light generating device may be configured to irradiate via another groove another first body (see further also below). However, another light generating device may also be configured to irradiate a second body, e.g. comprising a diffuser, via another groove (see further also below).

Especially, the first body may be configured at the end of the groove, closest to the central cavity. The first body is at least partly configured in the groove, though part of it may extend into the central cavity. Especially, however, the first body is entirely configured in the groove. However, the distance from the first body to the central cavity may be relatively small. Hence, in embodiments, the first body may be configured at a distance (d1) from the central cavity selected from the range of 0-20% of the groove length (L).

The cavity may have a substantially cylindric shape. The height (or depth) of the cavity may in embodiments be essentially the same as the height (or depth) of the grooves. The edge(s) of the central cavity may be defined by material of the beam combiner body. However, the central cavity may also at least partly be defined by the first body. It may be desirable to have the first body relatively close to an optical axis of the beam combiner body. The optical axis of the beam combiner body may at least partly coincide with a normal to the central cavity (in the middle of the central cavity).

Especially, both the first body (first bodies) and the groove(s) have rectangular cross-sections, defined perpendicular to a (respective) groove axis. Hence, especially the n radially arranged grooves have rectangular cross-sections (perpendicular to respective groove axes). In specific embodiments, the cross-sections are square. When the groove has a rectangular cross-section (perpendicular to a groove axis), the groove may have two (groove) walls and a (groove) bottom.

As indicated above, the first body may be relatively thin (also relatively to the groove length). In specific embodiments, $0.001 \leq H1/L \leq 0.25$, such as especially $0.01 \leq H1/L \leq 0.1$. Note that a cross-section of the groove, perpendicular to a groove axis, may be a rectangle of $W*H$, whereas a cross-section of the first body, perpendicular to a groove axis, may be a rectangle of $W1*L1$. In specific embodiments, H1 may be selected from the range of 0.05-0.3 mm. H1 may especially be determined parallel to a groove axis 511.

As the first body may be relatively small, the first body may be supported by a first body support. The first body support may have a longer length than the height of the first body. This may facilitate handling of the first body and configuring the first body in the groove. The first body may be glued to the first body support. See further below for some specific examples of first body supports. The first body support may also provide a better thermal contact of the first body support with the beam combiner, as now thermal energy may also dissipate via a main face of the first body via the first body support to the beam combiner.

The first body support may have a width and a height essentially the same as the groove. Hence, the first body support may be configured to fit in the groove. Especially, the fit of the first body support in the groove may be a transition fit. The first body support may have a (longest) length (parallel to a groove axis) larger than the height of the first body. In embodiments, a longest first body support length L2 may be selected from the range of $0.05*L-0.95*L$, such as selected from the range of $0.1*L-0.5*L$. As indicated above, the luminescent material may be configured in the reflective mode or in the transmissive mode. A length of at least about $0.05*L$ may facilitate total internal reflection of the device light.

In embodiments, the first body may be operated in a transmissive mode, wherein the device light to be at least partly converted by the luminescent material propagates during operation of a respective light generating device through the radially arranged groove wherein the first body is configured, in a direction of the central cavity. Hence, the device radiation may propagate in a first groove in a direction of the central cavity and before reaching the central cavity, reaches the luminescent body in the same first groove. Therefore, the device light to be at least partly converted by the luminescent material may propagate during operation of a respective light generating device in a direction of the central cavity through the same radially arranged groove (as) wherein the first body is configured.

When using a first body support, the transmissive mode may impose the condition of transmissivity of the first body support for the device light. Under perpendicular radiation with the device light, this transmissivity may be at least 90%. Hence, in specific embodiment the system may comprise a first body support, wherein the first body support may be configured upstream of the first body in the radially arranged groove wherein the first body is configured, wherein the first body support may especially be configured to support the first body, and wherein the first body support is transmissive for the device light.

In embodiments the first body support, especially for the transmissive mode, may comprise sapphire. A transparent ceramic body may also be possible.

The terms "light-receiving relationship" or "light receiving relationship", and similar terms, may indicate that an item may during operation of a source of light (like a light generating device or light generating element or light generating system) may receive light from that source of light. Hence, the item may be configured downstream of that source of light. Between the source of light and the item, optics may be configured.

The terms "upstream" and "downstream", such as in the context of propagation of light, may especially relate to an arrangement of items or features relative to the propagation of the light from a light generating element (here the especially the first light source), wherein relative to a first position within a beam of light from the light generating element, a second position in the beam of light closer to the light generating element (than the first position) is "upstream", and a third position within the beam of light further away from the light generating element (than the first position) is "downstream". For instance, instead of the term "light generating element" also the term "light generating means" may be applied.

The terms "radiationally coupled" or "optically coupled" or "radiatively coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material. The term "in a light-receiving relationship" does, as indicated above, not exclude the presence of intermediate optical elements, such as lenses, collimators, reflectors, dichroic mirrors, etc. In embodiments, the term "light-receiving relationship" and "downstream" may essentially be synonyms.

In the transmissive mode, especially n≥m may apply. Note that in embodiments m is at least 2. Hence, when m=2, n is at least 2.

Alternatively, the luminescent material may be operated in the reflective mode. In specific embodiments the first body may be operated in a reflective mode, wherein the device light to be at least partly converted by the luminescent material may propagate during operation of a respective light generating device through the radially arranged groove in a direction of the first body, wherein the first body is configured in a radially arranged groove downstream of the central cavity, relative to the respective light generating device. Hence, the device radiation may propagate in a first groove in a direction of the central cavity, propagates through the first cavity, before reaching the luminescent body which is configured in a second groove (opposite of the first groove; opposite relative to the central cavity).

When using a first body support, the reflective mode may allow the condition of reflectivity of the first body support for the device light. Under perpendicular radiation with the device light, this reflection may be at least 90%. Hence, in specific embodiment the system may comprise a first body support, wherein the first body support is configured downstream of the first body, wherein the first body support is configured to support the first body, and wherein the first body support is reflective for the device light (and especially also for the luminescent material light).

In the reflective mode, especially n≥2*m may apply.

To improve escape of luminescent material light from the central cavity and/or escape of device light from the central cavity, it may be desirable to have the first body configured under an angle and/or having a slanted face directed to the central cavity. In specific embodiments, wherein the n radially arranged grooves have groove axes, wherein a face of the first body, directed to the central cavity, is configured under a first angle ($\alpha 1$) with the groove axis of the groove wherein the first body is configured, wherein the first angle ($\alpha 1$) may be selected from the range of 15-75°.

When a first body support is applied, the first body support may also have a slanted end face, to which the first body may be configured.

Light may emanate from the central cavity. This light may be the system light. Hence, the system light generated by the system may comprise one or more of device light and luminescent material light that escapes from the central cavity. As can be derived from the above, the central cavity may have a reflective bottom. The central cavity may also have walls that are reflective.

The central cavity may in embodiments have essentially no walls. This may be the case in embodiments wherein the radially arranged groove have edges essentially converted at the central cavity.

The beam combiner body may be combined with an optical element, e.g. to beam shape the system light. For instance, a collimator may be applied to create a less divergent beam of device light. In specific embodiments, the beam combiner body may be configured in an optical element, especially a hollow optical element. For instance, the beam combiner body may be configured in a hollow reflector, wherein especially a focal point of the hollow reflector may coincide with at least part of the central cavity of the beam combiner body. The optical element, such as e.g. a hollow reflector, may e.g. comprise a parabolic reflector, such as a compound parabolic reflector (CPC), or similar (hollow) reflector. Especially, the optical element is configured in a light receiving relationship with the beam combiner body.

Hence, in embodiments the system may comprise a hollow reflector, wherein the beam combiner body is configured in the hollow reflector. Further, especially the hollow reflector may comprise a reflector optical axis (Or), wherein at least part of the reflector optical axis (Or) coincides with at least part of the central cavity. More especially a focal point of the hollow reflector may coincide with at least part of the central cavity of the beam combiner body. The light generating devices may be configured external of the hollow reflector. To introduce the device light into the hollow reflector, the hollow reflector may comprise (relatively small) holes in a reflector wall. The holes may be substantially smaller than an exit opening of the hollow reflector. For instance, a cross-sectional area of a hole in the reflector, indicated with Ah, may be at least 20 times, such as at least 50 times smaller than an area of the exit opening of the hollow reflector, indicated with Ao, i.e. Ah/Ao≤0.05. Hence, in embodiments the hollow reflector comprises a reflector wall wherein the reflector wall may comprise at least m light injection holes configured upstream of respective light radially arranged grooves and downstream of respective light generating devices.

As indicated above, the light generating system may comprise at least a single first body in a single groove. However, the system may also comprise two or more first bodies in two or more grooves, respectively.

In specific embodiments, the light generating system may comprise m grooves with first bodies configured therein (and optionally n-m first grooves with no first bodies configured therein), and m light generating devices, with each light generating device configured upstream of a single first body.

In specific embodiments, the light generating system comprises m grooves with first bodies configured therein (and optionally n-m first grooves with no first bodies configured therein), and m light generating devices, with each light generating device configured upstream of a single first body, and m optical elements, like lenses, to beam shape the device of the light generating devices, wherein the each optical element is configured downstream of a respective light generating device and upstream to a respective groove. Hence, the system may comprise m sets of a light generating device, a lens, and a groove. The optical element may e.g. be used for shaping the device light into a relatively collimated beam, such as in embodiments ≤2° (FWHM).

As indicated above, there may be one first body, there may be two or more essentially the same first bodies, and there may be two or more different first bodies. Essentially the same first bodies may provide luminescent material light having essentially the same spectral power distributions. Different first bodies may provide luminescent material light having different spectral power distributions. The latter embodiment may e.g. be used to provide system light that has a tunable spectral power distribution. Different first bodies may be indicated as primary first body, secondary first body, etc.

Hence, in embodiments the light generating system may comprise at least two first bodies configured in different radially arranged grooves, wherein the at least two first bodies comprise at least two different luminescent materials, wherein a primary first body of the at least two first bodies is configured to convert at least part of the device light into (primary) luminescent material light having a primary spectral power distribution, wherein a secondary first body of the at least two first bodies is configured to convert at least part of the device light into (secondary) luminescent material light having a secondary spectral power distribution different from the primary spectral power distribution. In specific embodiments, at least one of the at least two different luminescent materials (of the primary first body and secondary first body) may comprise a luminescent material of the type $A_3B_5O_{12}$:Ce, wherein A comprises one or more of Y, La, Gd, Tb and Lu, and wherein B comprises one or more of Al, Ga, In, and Sc. In other specific embodiments, at least two first bodies each comprise a luminescent material of the type $A_3B_5O_{12}$:Ce, wherein A comprises one or more of Y, La, Gd, Tb and Lu, and wherein B comprises one or more of Al, Ga, In, and Sc, but at least two of the at least two first bodies comprise luminescent materials of the type $A_3B_5O_{12}$:Ce having different chemical compositions and/or cerium concentrations, leading to luminescent material light having different spectral distributions.

In embodiments, luminescent material light of different first bodies having different spectral power distributions may lead to system light having different correlated color temperatures when controlling the light generating devices. In embodiments, the system light may have a controllable CCT, with a possible difference between two possible CCT values of at least 500 K, more especially at least 1000 K, like at least 2000 K.

Alternatively or additionally, it may also be possible to use two or more different light generating devices. Different light generating devices may provide device light having different spectral power distributions. The latter embodiment may e.g. (also) be used to provide system light that has a tunable spectral power distribution. Different light generating devices may be indicated as primary light generating device, secondary light generating device, etc.

The light of the light generating devices having different spectral power distributions may be used for different first bodies comprising different luminescent materials. In this way, the spectral power distribution of the light generating device may be matched with the excitation spectrum of the respective luminescent material.

In embodiments, part of the device light may be coupled out due to reflection and/or scattering and/or transmission at or via the first body.

However, alternatively or additionally, part of the device light may be coupled out via a reflective body. To this end, a second body may be applied, that may be especially reflective for the device light. Hence, in embodiments at least one of the radially arranged grooves may comprise a second body, wherein the second body is configured to reflect at least part of the device light. Especially, in such embodiments there may be at least two different light generating devices, configured to generate device light having different spectral power distributions, wherein the device light of one type of the at least two light generating devices is used to generate luminescent material light via the first body (or first bodies), and wherein the device light of another type of the at least two light generating devices may be used to admix in the system light via reflection at a second body. For instance, a blue laser may be applied to excite a garnet luminescent material, and a red laser may be used to provide red laser light, which is admixed with the system light.

In embodiments, the light generating devices only comprise light generating devices configured to generate blue device light. In other embodiments, the light generating devices comprise one or more first light generating devices configured to generate blue light and one or more first light generating devices configured to generate red light. The latter may especially be used in combination with downstream configured reflective second bodies.

The light generating devices may be controlled by a control system. Hence, in embodiments the system may further comprise a control system, wherein the control system is configured to control the m light generating devices. In specific embodiments, in an operational mode of the light generating system, the light generating system may be configured to generate white system light.

Especially, in an operational mode the system light may comprise at least device light and luminescent material light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In embodiments, the correlated color temperature of the system light may be controllable.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a lighting device selected from the group of a lamp, a luminaire, a projector device, a disinfection device, a photochemical reactor, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the lighting devices and the beam combiner body. The lighting device may in embodiments be a package.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1b and 2a-2b schematically depict some embodiments and aspects;

The schematic drawings are not necessarily to scale.

DETAILED DESCRIPTION OF THE EMBODIMENTS

Figure 1A:
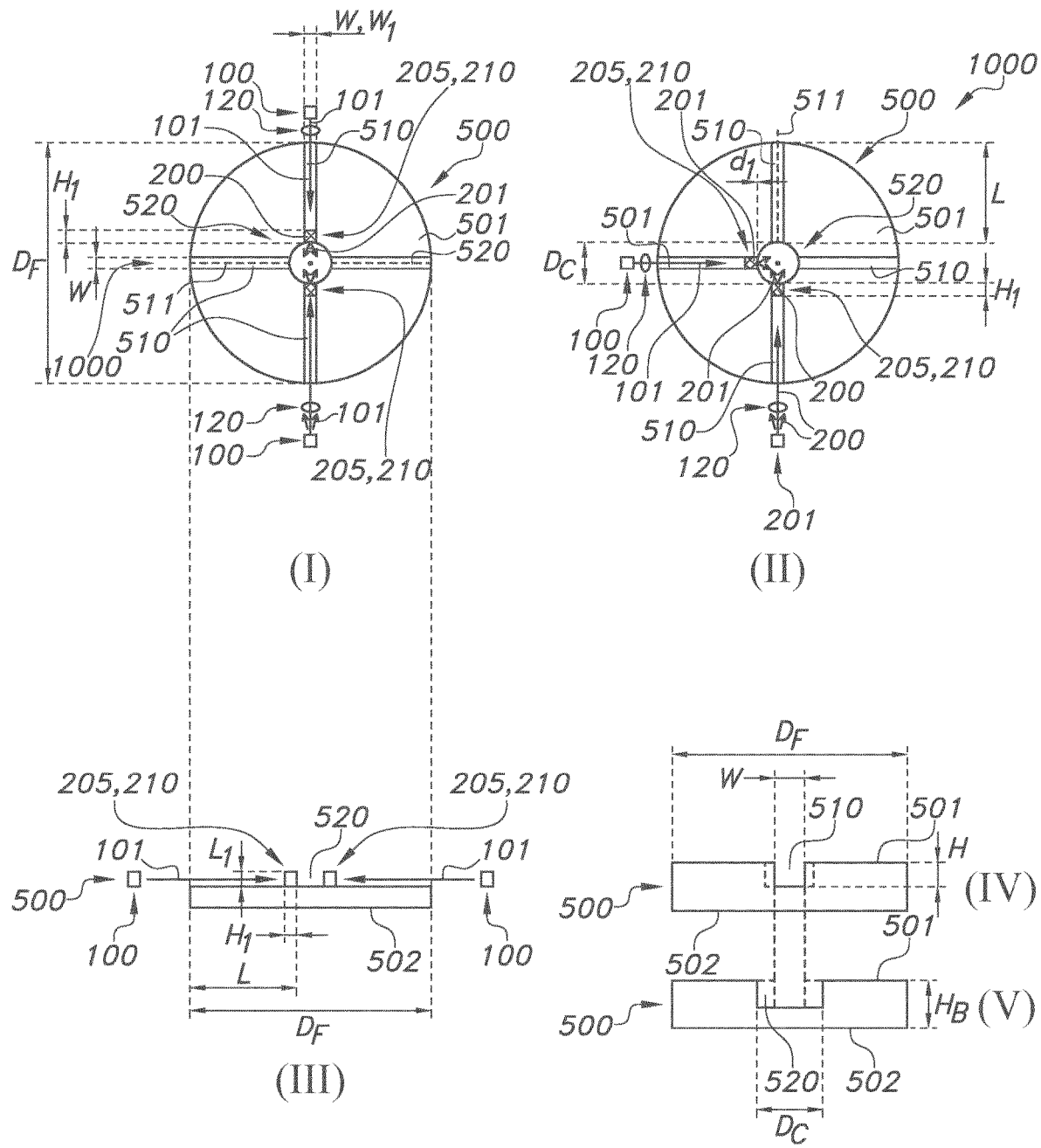

FIG. 1a schematically depicts in embodiments I and II two top views of essentially the same beam combiner bodies 500, but with different configurations of the light generating devices 100 and first bodies 205.

Schematically, in embodiments I and II embodiments of a light generating system 1000 comprising m light generating devices 100 and a beam combiner body 500 are depicted.

The m light generating devices 100 are configured to generate device light 101. Especially, the light generating devices 100 comprise one or more light sources selected from the group of lasers and superluminescent diodes. In embodiments, m≥2. In both schematically depicted embodiments, m=2.

The beam combiner body 500 may comprise a first face 501. The first face 501 comprises n radially arranged grooves 510 radially extending from a central cavity 520, wherein n≥2. Here, embodiments with n=4 are schematically depicted. The n radially arranged grooves 510 have groove lengths L.

Especially, at least one of the radially arranged grooves 510 may comprise a first body 205. Here, two of the grooves 510 each comprise a first body 205. The first body 205 may comprise a luminescent body 210. Especially, the luminescent body 210 may comprise a luminescent material 200 configured to convert at least part of the device light 101 into luminescent material light 201. The first body 205 has a first body height H1 smaller than the groove length L.

Especially, the m light generating devices 100 and the beam combiner body 500 are configured such that at least part of the device light 101 of the m light generating devices 100 propagates during operation of the m light generating devices 100 through the radially arranged grooves 510 in a direction of the central cavity 520, and at least one of the m light generating devices 100 may be configured to irradiate the first body 205.

References 120 refer to lenses to focus and/or collimate the device light 101, in order to maximize the percentage of the device light reaching the first body 205 via the groove 510 downstream of the respective light generating device 100.

Reference Df refers to the diameter of the beam combiner body 500 (or of the first face 501. Reference Dc refers to the diameter of the central cavity 520.

The more grooves, the less cavity walls there may be. The central cavity may in embodiments have essentially no walls. This may be the case in embodiments wherein the radially arranged groove have edges essentially converted at the central cavity.

Reference 511 refers to axes, or axes of elongation, of the grooves 510. Reference W refers to the width of the groove 510 and reference W1 refers to a width of the first body 205, which may essentially be the same. Reference d1 indicates a (shortest) distance of the first body to the central cavity 520.

Reference 502 refers to a second face of the beam combiner body. The first face 501 and the second face 502 may define a beam combiner height $H_B$. In embodiments, $H_B>L1$, like at least two times larger, and $H_B>W1$, like at least two times larger.

The beam combiner body 500 may be (a) thermally conductive and/or (b) reflective for one or more of the device light 101 and the luminescent material light 201. The beam combiner body 500 may comprise a metal body or a ceramic body.

As the beam combiner may be reflective, the walls of the grooves may be reflective, the bottom of the grooves may be reflective. Likewise, the central cavity may have a bottom that is reflective. The central cavity may also have walls that are reflective. Here, "reflective" may especially indicate reflective for the device light 101 and/or the luminescent material light 201.

The n radially arranged grooves 510 may have rectangular cross-sections (perpendicular to respective groove axes 511).

In embodiment I of FIG. 1a, the first bodies 205 may be operated in a transmissive mode. The device light 101 to be at least partly converted by the luminescent material 200 propagates during operation of a respective light generating device 100 through the radially arranged groove 510 to the first body 205 (configured in the same groove 510) in a direction of the central cavity 520. Especially, n≥m.

In embodiment II of FIG. 1a, the first bodies 205 may be operated in a reflective mode. The device light 101 to be at least partly converted by the luminescent material 200 propagates during operation of a respective light generating device 100 through the radially arranged groove 510 in a direction of the first body 205. The first body 205 may be configured in a radially arranged groove 510 downstream of the central cavity 520, relative to the respective light generating device 100. Hence, the groove 510 configured directly downstream of the light generating device 100 may be another groove 510 than wherein the first body 205 is configured that is configured to convert at least part of the device light 101 of that light generating device 100. Especially, n≥2*m.

Embodiment III of FIG. 1a schematically depict a cross-sectional view of embodiment I, where the cross-section is taken along the two grooves 510 wherein the first bodies 205 are configured. Reference 502 indicates another (main) face of the beam combiner body 500. Faces 501 and 502 may in embodiments be parallel.

Embodiment IV of FIG. 1 schematically depicts a cross-section of the beam combiner body 500 at a position where also a groove 510 is present. Hence, also a cross-section of a groove 510 is shown. The dashed part schematically depicts the central cavity 520, which may be configured behind or in front of the plane of drawing.

Embodiment IV of FIG. 1 schematically depicts a cross-section of the beam combiner body 500 at a position where also the central cavity 520 is present. Hence, also a cross-section of the central cavity 520 is shown. The dashed part schematically depicts a groove 510, which may be configured behind or in front of the plane of drawing.

FIG. 1b schematically depict cross-sectional views of a possible transmissive embodiment (embodiment I) and a possible reflective embodiment (embodiment II), respectively.

As schematically depicted, the first body 205 may be configured at a distance d1 from the central cavity 520 selected from the range of 0-20% of the groove length L.

Referring to embodiment I, the light generating system 1000 may comprise a first body support 550. The first body support 550 may be configured upstream of the first body 205 in the radially arranged groove 510. The first body support 550 may be configured to support the first body 205. The first body support 550 may be transmissive for the device light 101. The first body support 550 may have a (maximum) length L2.

Referring to embodiment II, the light generating system 1000 may comprise a first body support 550. The first body support 550 may be configured downstream of the first body 205. The first body support 550 may be configured to support the first body 205. The first body support 550 may be reflective for the device light 101 (and for the luminescent material light 201).

Further referring to embodiments I and II of FIG. 1b, a face 206 of the first body 205, directed to the central cavity 520, may be configured under a first angle $\alpha 1$ with the groove axis 511 of the groove 510. The first angle $\alpha 1$ may be selected from the range of 15-75°.

Referring to FIG. 2a, the light generating system 1000 may comprise an optical element 610, such as a hollow reflector. The beam combiner body 500 may be configured in the optical element 610, such as a hollow reflector. The hollow reflector may comprise a reflector wall 611. The reflector wall 611 may comprise at least m light injection holes 612 configured upstream of respective light radially arranged grooves 510 and downstream of respective light generating devices 100. The optical element 610, such as a hollow reflector may comprise a reflector optical axis Or. At least part of the reflector optical axis Or coincides with at least part of the central cavity 520. Using reflectors within the beam combiner body 500 and/or external thereof, may allow different configurations of the light generating devices 100 relative to the combiner body 500.

Reference 300 refers to a control system, configured to control the light generating devices 100. The control system 300 may be configured to control the m light generating devices 100.

In an operational mode of the light generating system 1000, the light generating system 1000 may be configured to generate white system light 1001. In embodiments, the system light may comprise at least device light 101 and luminescent material light 201.

Figure 2B:
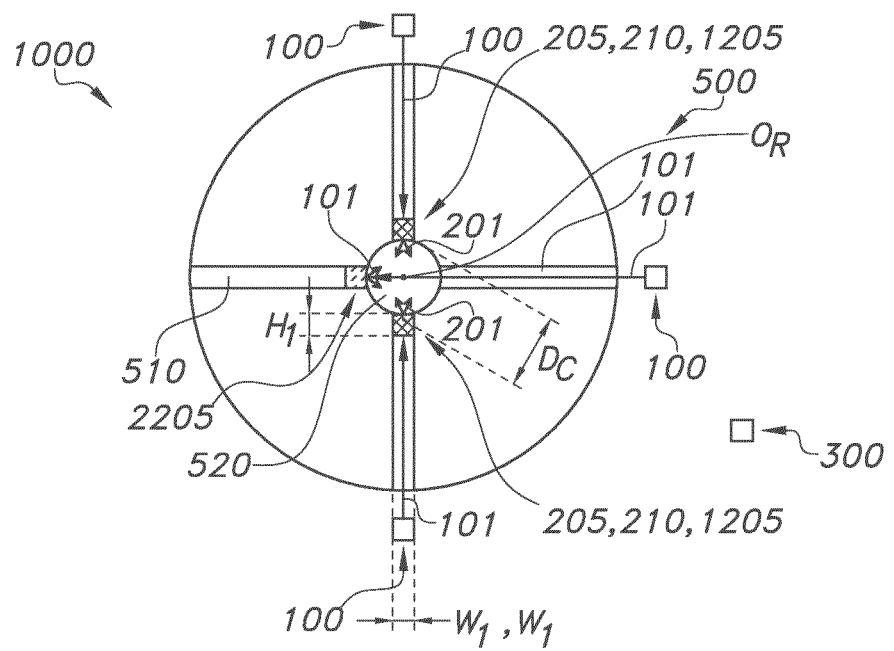

Referring to FIG. 2b, the light generating system 1000 may comprise at least two first bodies 205 configured in different radially arranged grooves 510. The at least two first bodies 205 may comprise at least two different luminescent materials 200. A primary first body 1205 of the at least two first bodies 205 may be configured to convert at least part of the device light 101 into (primary) luminescent material light 201 having a primary spectral power distribution. A secondary first body 1205 of the at least two first bodies 205 may be configured to convert at least part of the device light 101 into (secondary) luminescent material light 201 having a secondary spectral power distribution different from the primary spectral power distribution. In specific embodiments, at least one of the at least two different luminescent materials 200 may comprise a luminescent material of the type $A_3B_5O_{12}$:Ce, A may comprise one or more of Y, La, Gd, Tb and Lu, and B may comprise one or more of Al, Ga, In, and Sc.

Referring to FIG. 2b, at least one of the radially arranged grooves 510 may comprise second body 2205. In embodiments, the second body 2205 may be configured to reflect at least part of the device light 101.

Figure 3:
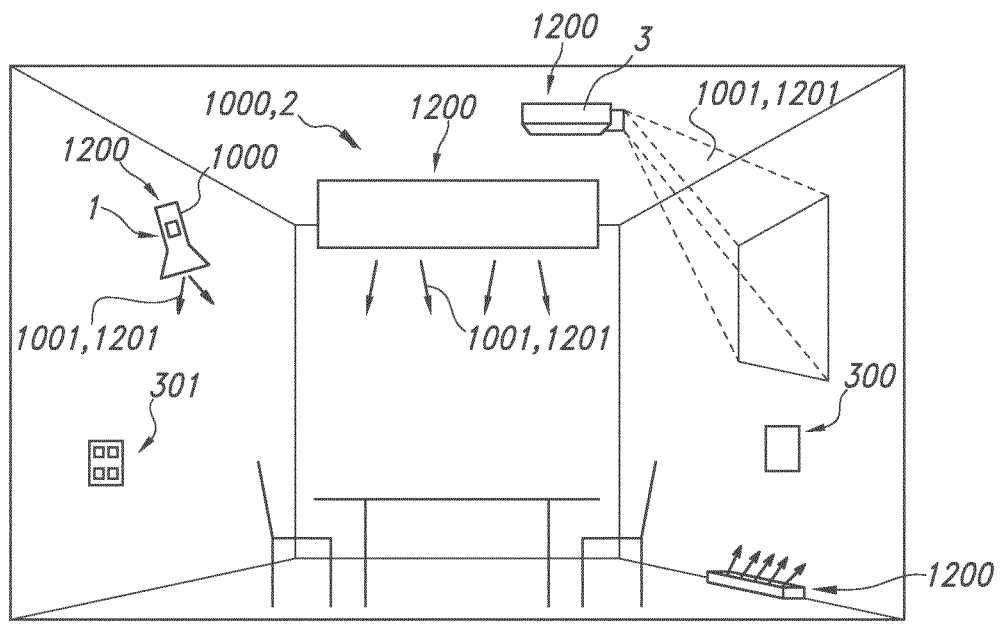
FIG. 3 schematically depict some application embodiments.

The spectral power distributions of the device light 101 may differ for two or more of the light generating devices. Alternatively or additionally, the spectral power distributions of the device light 101 may essentially be the same for two or more of the light generating devices FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

In embodiments, holes in a reflector cup may be used as part of the optical path to address the luminescent material comprising first bodies in the beam combiner body. These holes may provide a path at the bottom of the reflector cup to have a laser beam enter the inner space of the reflector cup and may address the mounted luminescent material comprising first bodies in the center of, or around the optical axis of the reflector cup. With this optical solution the lasers can be placed in the same plane as the luminescent material comprising first bodies. The benefit may be a compact assembly for lasers and luminescent material comprising first bodies without additional beam splitters or beam concentrators. The holes can be divided over the circumference of the reflector cup, there where they will be aligned with the radial positioned rectangle grooves on the beam combiner body pointing to the center of the disc.

In embodiments, the number of grooves can be selected from 1 to 100, but especially at least 2. With the note that adding more than three grooves to the radial, the intermediate distance of the grooves to the center of the disc becomes larger, which may have impact on the etendue of the optical system.

As mentioned the grooves may especially be used to mount luminescent material comprising first bodies in. The luminescent material comprising first bodies may be attached to a rectangle rod which has the size of the rectangle groove of the beam combiner body. The rectangle rod can be of a metal when used in the reflective mode or of a sapphire when used in the translucent. In both set up the rods can be glued or soldered in the grooves of the beam combiner body. With the close fitting of the luminescent material comprising first body rod in the grooves, a high thermal contact may be reached.

Making use of the beam combiner body allows combinations of luminescent material comprising first bodies with different CCT in a simple plane at the center of the optic axis. There may substantially be no need for additional optics like beam splitters or dichroic mirrors to have two or more different luminescent material comprising first bodies centered in the optical path.

With this approach two or more lasers may address two or more luminescent material comprising first bodies with different CCT. While the light emitting surface is already placed in the reflector cup. There is a minimal need for additional optics to guide and mix the light in the reflector.

By tuning the power of the lasers, different color temperatures can be obtained.

Adding a red phosphor luminescent material comprising first body to the light source a high CRI can be obtained.

Also direct red, green, or blue lasers can be installed and where in the phosphor option luminescent material comprising first bodies where installed there are now (diffused) mirrors placed to guide the individual lasers.

In an embodiment, luminescent material comprising first body may be glued with a transparent dye attach material on a sapphire rectangle rod. The sapphire rod may act as a light guide and at the same time as a thermal conductor to take away the heat from the luminescent material comprising first body. The luminescent material comprising first body-rod assembly may be clamped or glued to the heatsink of the beam combiner body. The luminescent material comprising first body may be positioned in the center of the optical path of the beam combiner body. In operation the laser points to the back end of the sapphire rod where it enters. By total internal reflection (TIR) the laser addresses the luminescent material comprising first body surface. Light is emitted towards the reflector. Mounting a second luminescent material comprising first body with a different CCT on a second sapphire rod and placing that on the opposite direction of the first Luminescent material comprising first body assembly will apply for a tunable CCT of the Light module. As said a multiple number of luminescent material comprising first body assemblies can be placed on the heatsink of the light module where combinations of different CCT and Red phosphors for adjusting CRI is possible. An advantage of the translucent mode assembly is that the laser beam addresses the luminescent material comprising first body from the back side. This means that there may be more space available in the beam combiner body on the diameter of the assembly to mount individual lasers and thus also luminescent material comprising first bodies. A disadvantage may be a less efficient cooling of the luminescent material comprising first body through the sapphire rod.

In another embodiment, a luminescent material comprising first body may be glued or soldered on a metal rectangle rod and subsequently attached on the beam combiner body. Where the position of the luminescent material comprising first body is in the center of the optical path. In this mode the laser may be positioned opposite of the position of the luminescent material comprising first body and directly hit the luminescent material comprising first body on the front side. Light is emitted in the reflective mode. The thermal load of the luminescent material comprising first body may instantly be directed to the beam combiner body acting as heat sink. Where in the translucent mode a sapphire rod may be used, the reflective mode may make use of a copper rod insert to glue the luminescent material comprising first body on. An advantage of the reflective mode assembly may be a better thermal behavior of the luminescent material comprising first body. The luminescent material comprising first body can be plated with a metal coating on its back side what allows the luminescent material comprising first body to be soldered on the heatsink, which improves the thermal behavior even more. Soldering may increase the thermal conductivity, typical 50-70 Wm/K for solder and 0.2-04 Wm/K for dye attach epoxy materials. Next to a better thermal behavior also light efficiency is increased. The heat sink can be plated with a reflector coating which makes the light extraction from the luminescent material comprising first body more efficient. A disadvantage of the reflective mode is that the laser beam which addresses a luminescent material comprising first body occupies space opposite of the luminescent material comprising first body. Half of the amount of laser/luminescent material comprising first bodies can be placed on the available space in the light module.

A more direct approach may be to place the laser diode on a radial distance from the axial axe of the light module, where the TO can may be placed in line with the radial axe. This design method places the laser beam direct in line with the luminescent material comprising first body. Here the laser beam also punches through the reflector cup via small holes. With this design a thin module may be possible.

In transmissive mode where a sapphire rod is used, the rod may have the same size as the first body. Otherwise (blue) light from the laser may be leaking next to the first body. The first body may be glued with a transparent dye attach paste to the sapphire rod. In a reflective mode, the rod may be somewhat larger than the first body. There the first body may be glued or soldered to a metal rod.

The invention claimed is:

1. A light generating system comprising m light generating devices and a beam combiner body, wherein:
   the m light generating devices are configured to generate device light, wherein the light generating devices comprise one or more light sources selected from the group of lasers and superluminescent diodes, wherein m≥2;
   the beam combiner body comprises a first face, wherein the first face comprises n radially arranged grooves radially extending from a central cavity, wherein n≥2, wherein the n radially arranged grooves have groove lengths;
   at least one of the radially arranged grooves comprises a first body, wherein the first body comprises a luminescent body, wherein the luminescent body comprises a luminescent material configured to convert at least part of the device light into luminescent material light; wherein the first body has a first body height as determined in parallel to the groove length of the at least one of the radially arranged grooves, the first body height being smaller than the groove length of the at least one of the radially arranged grooves;
   the m light generating devices and the beam combiner body are configured such that at least part of the device light of the m light generating devices propagates during operation of the m light generating devices through the radially arranged grooves in a direction of the central cavity, and at least one of the m light generating devices is configured to irradiate the first body.

2. The light generating system according to claim 1, wherein the beam combiner body is thermally conductive and/or reflective for one or more of the device light and the luminescent material light.

3. The light generating system according to claim 1, wherein the beam combiner body comprises a metal body or a ceramic body.

4. The light generating system according to claim 1, wherein the first body is operated in a transmissive mode, wherein the device light to be at least partly converted by the luminescent material propagates during operation of a respective light generating device in a direction of the central cavity through the same radially arranged groove wherein the first body is configured.

5. The light generating system according to claim 4, comprising a first body support, wherein the first body support is configured upstream of the first body in the radially arranged groove wherein the first body is configured, wherein the first body support is configured to support the first body, and wherein the first body support is transmissive for the device light.

6. The light generating system according to claim 4, wherein n≥m.

7. The light generating system according to claim 1, wherein the first body is operated in a reflective mode, wherein the device light to be at least partly converted by the luminescent material propagates during operation of a respective light generating device through the radially arranged groove in a direction of the first body, wherein the first body is configured in a radially arranged groove downstream of the central cavity, relative to the respective light generating device.

8. The light generating system according to claim 7, comprising a first body support, wherein the first body support is configured downstream of the first body, wherein the first body support is configured to support the first body, and wherein the first body support is reflective for the device light.

9. The light generating system according to claim 7, wherein n≥2*m.

10. The light generating system according to claim 1, wherein the n radially arranged grooves have groove axes, wherein a face of the first body, directed to the central cavity, is configured under a first angle with the groove axis of the groove wherein the first body is configured, wherein the first angle is selected from the range of 15-75°.

11. The light generating system according to claim 1, comprising a hollow reflector, wherein the beam combiner body is configured in the hollow reflector, wherein:
   the hollow reflector comprises a reflector wall wherein the reflector wall comprises at least m light injection holes configured upstream of respective light radially arranged grooves and downstream of respective light generating devices; and the hollow reflector comprises a reflector optical axis, wherein at least part of the reflector optical axis coincides with at least part of the central cavity.

12. The light generating system according to claim 1, comprising at least two first bodies configured in different radially arranged grooves, wherein the at least two first bodies comprise at least two different luminescent materials, wherein a primary first body of the at least two first bodies is configured to convert at least part of the device light into luminescent material light having a primary spectral power distribution, wherein a secondary first body of the at least two first bodies is configured to convert at least part of the device light into luminescent material light having a secondary spectral power distribution different from the primary spectral power distribution; wherein at least one of the at least two different luminescent materials comprises a luminescent material of the type $A_3B_5O_{12}$:Ce, wherein A comprises one or more of Y, La, Gd, Tb and Lu, and wherein B comprises one or more of Al, Ga, In, and Sc.

13. The light generating system according to claim 1, wherein at least one of the radially arranged grooves comprises second body, wherein the second body is configured to reflect at least part of the device light.

14. The light generating system according to claim 12 further comprising a control system, wherein the control system is configured to control the m light generating devices, wherein in an operational mode of the light generating system, the light generating system is configured to generate white system light, wherein the system light comprises at least device light and luminescent material light.

15. A lighting device selected from the group of a lamp, a luminaire, a projector device, a disinfection device, a photochemical reactor, and an optical wireless communication device, comprising the light generating system according to claim 1.

* * * * *